United States Patent
Tofts et al.

(10) Patent No.: US 10,749,769 B2
(45) Date of Patent: Aug. 18, 2020

(54) IDENTIFY SERVER CLUSTER BY APPLYING SOCIAL GROUP ANALYSIS

(71) Applicant: ENT. SERVICES DEVELOPMENT CORPORATION LP, Houston, TX (US)

(72) Inventors: Chris Tofts, Bristol (GB); Pablo Macaya Garcia, Sant Cugat del Valles (ES)

(73) Assignee: ENT. SERVICES DEVELOPMENT CORPORATION LP, Houston, TX (US)

( * ) Notice: Subject to any disclaimer, the term of this patent is extended or adjusted under 35 U.S.C. 154(b) by 221 days.

(21) Appl. No.: 15/306,717

(22) PCT Filed: Aug. 28, 2014

(86) PCT No.: PCT/US2014/053154
§ 371 (c)(1),
(2) Date: Oct. 25, 2016

(87) PCT Pub. No.: WO2016/032485
PCT Pub. Date: Mar. 3, 2016

(65) Prior Publication Data
US 2017/0163504 A1 Jun. 8, 2017

(51) Int. Cl.
*H04L 12/24* (2006.01)
*H04L 29/08* (2006.01)
*H04L 12/26* (2006.01)
*H04L 12/46* (2006.01)

(52) U.S. Cl.
CPC ........ *H04L 43/062* (2013.01); *H04L 12/4625* (2013.01); *H04L 43/028* (2013.01); *H04L 43/045* (2013.01); *H04L 67/10* (2013.01)

(58) Field of Classification Search
CPC .. H04L 12/4625; H04L 43/028; H04L 43/045
USPC ......................... 709/220, 223, 224, 226, 227
See application file for complete search history.

(56) References Cited

U.S. PATENT DOCUMENTS

| | | |
|---|---|---|
| 8,458,733 B2 | 6/2013 | Kim et al. |
| 8,484,213 B2 | 7/2013 | Wolafka et al. |
| 8,561,184 B1 | 10/2013 | Marsa et al. |
| 8,689,108 B1 | 4/2014 | Duffield et al. |
| 9,338,097 B2 * | 5/2016 | Anand .................. H04L 47/125 |

(Continued)

OTHER PUBLICATIONS

"Secure Clustering in Private Networks"—Yang et al, University of Tokyo, Dec. 2011 https://www.researchgate.net/profile/Bin_Yang52/publication/220765225_Secure_Clustering_in_Private_Networks/links/54d1922a0cf25ba0f0416ca3/Secure-Clustering-in-Private-Networks.pdf (Year: 2011).*

(Continued)

*Primary Examiner* — Randy A Scott
(74) *Attorney, Agent, or Firm* — Sheppard Mullin Richter & Hampton LLP

(57) ABSTRACT

Examples of identifying a cluster of servers and generating a graphical representation of the cluster of servers are disclosed. In one example implementation according to aspects of the present disclosure, a cluster of servers may be identified based on applying a social group analysis to network traffic related to a plurality of interconnected servers. A graphical representation of the identified cluster of servers may be generated.

20 Claims, 8 Drawing Sheets

(56) References Cited

U.S. PATENT DOCUMENTS

| | | | |
|---|---|---|---|
| 2003/0147369 A1* | 8/2003 | Singh | H04L 1/0007 370/338 |
| 2006/0015588 A1* | 1/2006 | Achlioptas | G06Q 10/107 709/220 |
| 2007/0226248 A1 | 9/2007 | Darr | |
| 2012/0047394 A1* | 2/2012 | Jain | G06F 11/2028 714/4.11 |
| 2012/0059767 A1 | 3/2012 | Uthmann | |
| 2012/0158858 A1 | 6/2012 | Gkantsidis et al. | |
| 2013/0091208 A1* | 4/2013 | Rajakarunanayake | H04W 4/21 709/204 |
| 2013/0117364 A1 | 5/2013 | Bania et al. | |
| 2014/0130054 A1 | 5/2014 | Molkov et al. | |
| 2014/0143407 A1 | 5/2014 | Zhang et al. | |
| 2014/0310427 A1* | 10/2014 | Shaw | H04L 45/04 709/244 |
| 2014/0317019 A1* | 10/2014 | Papenbrock | G06Q 40/06 705/36 R |
| 2015/0006619 A1* | 1/2015 | Banadaki | H04L 67/10 709/203 |
| 2015/0058466 A1* | 2/2015 | Cha | H04L 41/12 709/223 |
| 2015/0095432 A1* | 4/2015 | Soundararajan | H04L 51/32 709/206 |
| 2015/0117216 A1* | 4/2015 | Anand | H04L 47/125 370/236 |

OTHER PUBLICATIONS

PCT; "Notification of Transmittal of the International Search Report and the Written Opinion of the International Searching Authority, or the Declaration"; cited in PCT/US2014/053154; dated May 22, 2015; 16 pages.

Yang et al, "Secure Clustering in Private Networks", Dec. 11-14, 2011, IEEE Int'l Conf on Data Mining, pp. 894-903. http://ieeexplore.ieee.org/stamp/stamp.jsp?arnumber=6137294.

* cited by examiner

IDENTIFY SERVER CLUSTER BY APPLYING SOCIAL GROUP ANALYSIS

CLAIM FOR PRIORITY

The present application is a national stage filing under 35 U.S.C. § 371 of PCT application number PCT/US2014/053154, having an international filing date of Aug. 28, 2014, the disclosure of which is hereby incorporated by reference in its entirety.

BACKGROUND

Organizations with large amounts of data may utilize many servers for storing and processing the data. In particular, in the big data era with growing datasets to analyze, organizations are utilizing distributed programing models and distributed compute environments hosted in data centers. These data centers allow organizations to take advantage of shared resources while providing security and redundancy. These data centers may contain hundreds, thousands, or even tens of thousands of servers running a variety of software applications that utilize data stored on the servers. In such cases, the data may be transmitted among the servers across a network or networks connecting the servers within the data center.

BRIEF DESCRIPTION OF THE DRAWINGS

The following detailed description references the drawings, in which.

DETAILED DESCRIPTION

Figure 2:
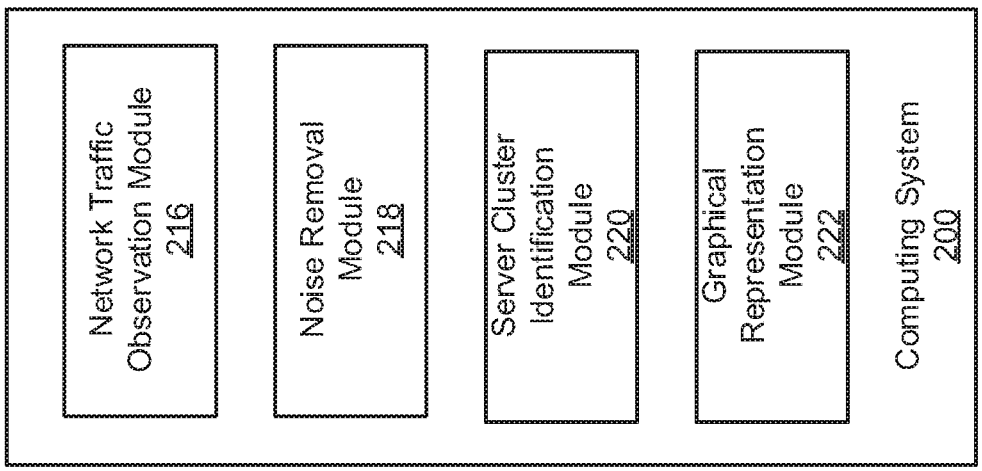
FIG. 2 illustrates a block diagram of a system to identify a cluster of servers according to examples of the present disclosure.

It may be desirable to move or relocate a computing server or servers in a data center from time to time. For example, servers may be moved from one geographic area to another geographic area for a variety of reasons, including data center costs, proximity to resources, reliability, etc. Similarly, servers may be moved within an existing data center to another physical area within the data center. These servers may be "business critical" to an organization and consequently cannot be removed from operation for extended periods of time (e.g. during typical maintenance windows spanning a few hours or even a few days). From time to time, the need may arise to move many or even all servers from one data center to another data center.

A number of issues may arise from moving servers from one physical location to another. For example, moving a server that communicates with another server or servers may sever communication between the servers, causing data and/or application functionality loss through increased latency. In data centers with hundreds or thousands of servers, it may be unknown which servers communicate with which other servers and which servers have dependencies and/or interdependencies due to attrition of network technicians, loss of institutional memory, application complexity, etc. As used herein, "server dependencies" and "server interdependencies" describe servers that communicate with one another to share applications, data, and/or resources.

Current techniques for identifying servers include manual inspection of the data, applications, and information contained within the current server landscape. However, manual inspection is a laborious, complex, and expensive undertaking. Moreover, manual inspection is frequently inaccurate as data center technicians may no longer be working in the data center and/or may forget about some server dependencies. In other examples, a configuration management database (CMDB) may be used to track server roles and dependencies between and among servers within the data center. However, relying on the information stored in a CMDB can cause other problems because CMDBs often contain mistakes or out-of-date information or were not created at the same time as the underlying systems. Consequently, CMDBs may not contain complete and accurate information.

If the wrong servers are moved, users of the servers may experience prolonged periods of down-time due to severed communicative paths between a moved server and a non-moved server, for example. Moreover, as the number of interconnected and dependent servers grows, the depth and complexity of the related data and applications may be overwhelming for network engineers to process and digest.

Various implementations are described below by referring to several examples of techniques for identifying a cluster of servers by applying social group analysis and generating a graphical representation of the cluster of servers. In one example implementation according to aspects of the present disclosure, a cluster of servers may be identified based on applying a social group analysis to network traffic related to a plurality of interconnected servers. In examples, the cluster of servers is a subset of the plurality of servers. A graphical representation of the identified cluster of interconnected servers may be generated, which may aid effective implementation of moving the cluster of servers.

In some implementations, the described techniques utilize network data in an unbiased way such that the data may be used equally. The techniques are not reliant on existing CMDBs or technician knowledge. Moreover, the techniques described are repeatable (the same network data sets will return the same identified clusters), scalable to hundreds or even thousands of servers, and rapid as they can grow with the evolution of data centers. The described techniques also utilize strategies relating to the evolving space of social analysis, which should continue to improve over time. These and other advantages will be apparent from the description that follows.

Figure 1:
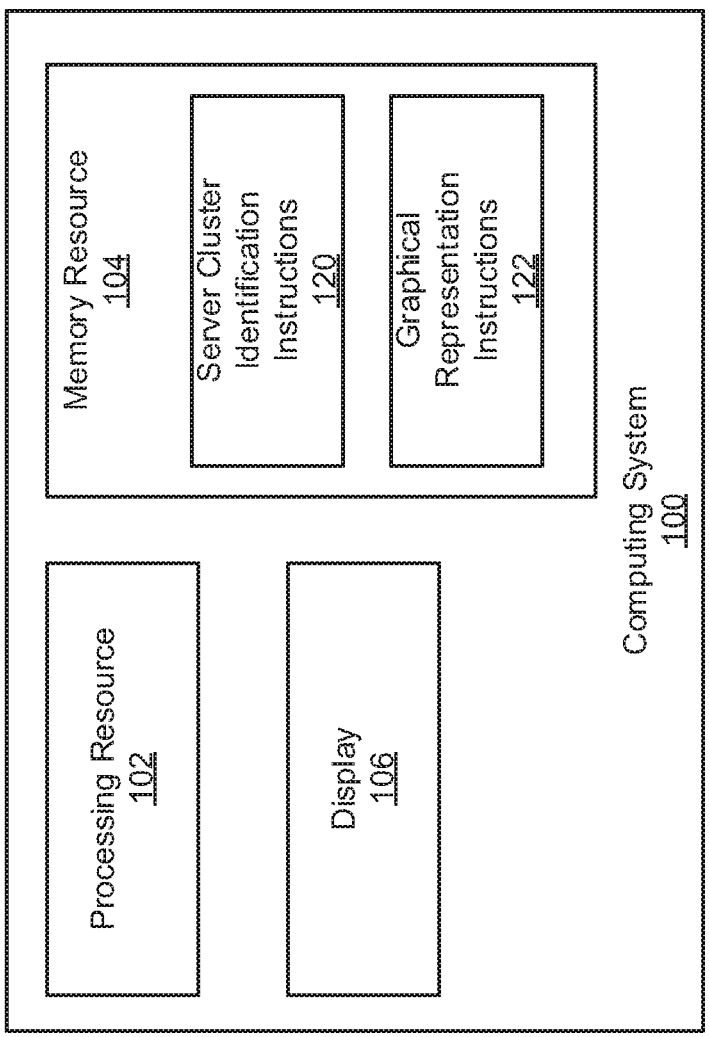
FIG. 1 illustrates a block diagram of a system to identify a cluster of servers according to examples of the present disclosure.
Figure 3:
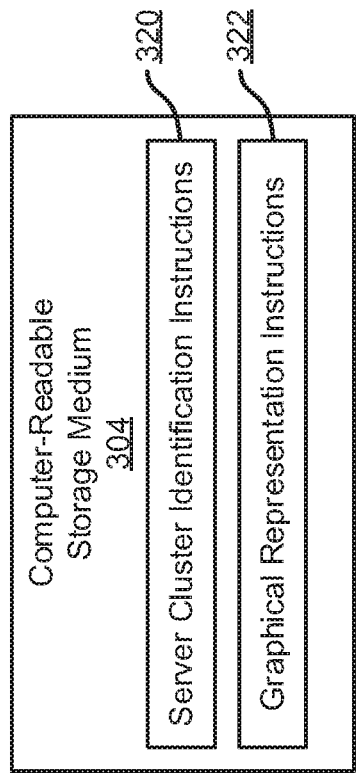
FIG. 3 illustrates a non-transitory computer-readable storage medium storing instructions executable to identify a cluster of servers according to examples of the present disclosure.

Generally, FIGS. 1-3 relate to components and modules of a computing system, such as computing system 100 of FIG. 1 and computing system 200 of FIG. 2. It should be understood that the computing systems 100 and 200 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, blade servers, rack servers, distributed servers, virtual servers, or the like. As used herein, the term "server" should be understood to mean any appropriate computing system, such as computing system 100 and/or computing system 200.

FIG. 1 illustrates a block diagram of a system 100 to identify a cluster of servers according to examples of the present disclosure. The computing system 100 may include a processing resource 102 that represents generally any suitable type or form of processing unit or units capable of processing data or interpreting and executing instructions. The processing resource 102 may be one or more central processing units (CPUs), microprocessors, and/or other hardware devices suitable for retrieval and execution of instructions such as instructions 120, 122.

The instructions 120, 122 may be stored, for example, on a non-transitory tangible computer-readable storage medium, such as memory resource 104 (as well as computer-readable storage medium 304 of FIG. 3), which may include any electronic, magnetic, optical, or other physical storage device that stores executable instructions. Thus, the memory resource 104 may be, for example, random access memory (RAM), electrically-erasable programmable read-only memory (EEPROM), a storage drive, an optical disk, and any other suitable type of volatile or non-volatile memory that stores instructions to cause a programmable processor to perform the techniques described herein. In examples, memory resource 104 includes a main memory, such as a RAM in which the instructions may be stored during runtime, and a secondary memory, such as a non-volatile memory in which a copy of the instructions is stored.

Alternatively or additionally, the computing system 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processing resources (or processing resources utilizing multiple processing threads and/or multiple processing cores) may be used, as appropriate, along with multiple memory resources and/or types of memory resources.

In addition, the computing system 100 may include a display 106. In examples, the display 106 may be or include a monitor, a touchscreen, a projection device, and/or a touch/sensory display device. The display 106 may display text, images, and other appropriate graphical content, such as the graphical representations generated by graphical representation instructions 122 described below. In examples, the display 106 may display a user interface.

The computing system 100 may be communicatively coupled, such as through a network interface (not shown), to a network (also not shown) that represents generally hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an intranet, the internet, or a combination of both. The network may also include intermediate proxies, routers, switches, load balancers, and the like. Through the network, the computing system 100 may communicate with other computing devices or systems by transmitting and/or receiving network traffic.

Additionally, the memory resource 104 of the computing system 100 may include server cluster identification instructions 120 and graphical representation instructions 122. The instructions may be processor executable instructions stored on a tangible memory resource such as memory resource 104, and executable by a hardware resource such as processing resource 102. Thus memory resource 104 can be said to store program instructions that when executed by the processing resource 102 implement the techniques described herein. Other instructions may also be utilized as will be discussed further below in other examples.

The server cluster identification instructions 120 analyze network traffic transmitted among a plurality of interconnected servers to identify a cluster of servers within a plurality of interconnected servers. For example, a plurality of servers may be interconnected via a network or networks such as in a data center or across multiple data centers. The plurality of servers may host and share data, applications, and resources (e.g., memory resources, processing resources, network resources, and/or storage resources). Consequently, the plurality of servers may transmit network traffic between and among the plurality of servers such that a first server may transmit network traffic to a second server (and/or to other servers). As used herein, the term "transmit" describes network traffic being sent and received across or through a network between and among servers.

The network traffic may be observed and recorded by a variety of network traffic measurement tools such as sFlow®, Wireshark®, and Universal Discovery. These tools generate an output of the network traffic in the form of a spreadsheet file, XML file, CSV file, or other appropriate file type, which contains a list of servers and for each of the servers a list of servers and computing devices connected thereto. The output may also indicate an amount of network traffic transmitted to other servers within the plurality of interconnected servers.

The server cluster identification instructions 120 analyze the network traffic by applying community or social group analysis techniques to the network traffic. By applying a community or social group analysis to the network traffic, it can be determined which of the plurality of servers are interconnected and in what ways the interconnected servers include dependencies upon others of the plurality of servers. For example, if an application is distributed across two servers such that a first server performs a first function and then transmits data to the second server to perform a second function, the servers are said to be dependent upon one another and thus have a dependency. Other types of dependencies and interdependencies may exist. As used herein, the term "dependencies" may include both dependencies and interdependencies.

A cluster of servers may be a group of servers that are interconnected (such as via a network) and share some dependencies. In examples, a cluster of servers may include servers with varying degrees of dependencies among the cluster. In other words, some of the servers within the cluster of servers may have a large number of dependencies with respect to other servers within the cluster while some servers within the cluster of servers may have only one or a few dependencies with respect to other servers within the cluster. Although the number and type of dependencies within the cluster of servers may vary, the cluster of servers is largely (i.e., almost entirely) independent from other interconnected servers (for example, other servers in the same data center as the cluster of servers) such that the cluster of servers shares few, if any, dependencies with other servers within the plurality of interconnected servers. In examples, the cluster of servers may be entirely independent from other servers or other clusters of servers within the plurality of interconnected servers.

It should be understood that multiple clusters may exist within a physical location such as a data center and that, although the clusters may be connected to one another by a network (i.e., the clusters and servers may be interconnected), each cluster of servers is substantially or entirely free from dependences (i.e. independent) from servers in the other clusters. In this way, the cluster of servers is a subset of the plurality of interconnected servers. It should be understood that a cluster of servers may have some dependencies with servers outside the cluster of servers in some examples.

Identifying a cluster or clusters of servers may be useful when it is desired to relocate some or all of the plurality of interconnected servers. By identifying clusters of servers, servers may be moved in such a way as to decrease negative impact on the servers. For example, servers in the same cluster may be moved together in order to maintain existing dependencies, thus increasing functionality to users while minimizing server downtime and the amount of work for network technicians.

The graphical representation instructions 122 may generate a graphical representation such as a two-dimensional and/or a three-dimensional graphical representation of the cluster or clusters of servers. The graphical representation may illustrate each server within the cluster of servers and the dependencies between each server within the cluster of servers. For example, a graphical representation may use a variety of shapes to indicate different server types (e.g., application servers, monitoring servers, storage servers, web servers, etc.). Similarly, dependencies may be shown as lines connecting the servers having dependencies. The number of dependencies or severity of the dependencies may be determined by the volume of network traffic transmitted between the servers within the cluster. Within the graphical representations, a volume of network traffic may be shown as numerical values on the lines representing the dependencies between the servers within the cluster. In examples, various colors may be used to illustrate different types of servers, different dependencies, volumes of network traffic, and similar information. Examples of such graphical representations are illustrated in FIGS. 6A-6E. The graphical representations may be displayed on display 106 of the computing system 100, such as through a user interface.

These numerical values provide measures of the "quality" of the cluster (i.e., the ratio of communication within the cluster to the total communication of the servers in the group). In this way, it can be determined which groups are viable for moving as-is and which may need to be further evaluated. Moreover, the analysis of the network traffic data can be used to generate the graphical representations by the graphical representation instructions 122. In examples, the network traffic data can be combined with data on the role or status of the servers, to provide additional detail for the graphical representations of the clusters and dependencies.

Tools such as the "igraph" package in the statistical computing application "R" may be used to apply the social group analysis techniques to the plurality of interconnected servers. In doing so, the server cluster identification instructions 120 may identify a cluster of servers within the plurality of interconnected servers and generate a graphical representation through the graphical representation instructions 122. A cluster of servers may be thought of as being similar to a "social group" in traditional social group analysis with the dependencies being thought of as "friendships" among the plurality of interconnected servers. Applying a social group analysis returns a cluster or a collection of clusters of servers which can be used as the basis for the selection of server move groups within the plurality of interconnected servers. The cluster identification techniques can be applied to graphs that are either weighted (i.e., including data on both the presence of a communication and its volumes) or unweighted (it is simply known that a communication took place). In other examples, when the weighted data is present, other clustering techniques may be applied such as the Markov Cluster Algorithm (MCL) or other techniques for determining relationships in social groups.

The graphical representations generated by the graphical representation instructions 122, such as those graphical representations illustrated in FIGS. 6A-6E may be manipulated for viewing, such as by a user of the computing system 100. For example, the graphical representations may be rotated, dragged, scaled, or otherwise manipulated to alter the perspective of the view of the graphical representations. In this way, the user may be able to better visualize the cluster of servers illustrated in the graphical representation.

FIG. 2 illustrates a block diagram of a computing system 200 to identify a cluster of servers according to examples of the present disclosure. The computing system 200 may include a network traffic observation module 216, a noise removal module 218, a server cluster identification module 220, and a graphical representation module 222.

In one example, the modules described herein may be a combination of hardware and programming instructions. The programming instructions may be processor executable instructions stored on a tangible memory resource such as memory resource 104 of FIG. 1, and the hardware may include a processing resource for executing those instructions such as processing resource 102 of FIG. 1. Thus the memory resource can be said to store program instructions that when executed by the processing resource implement the modules described herein. Other modules may also be utilized as will be discussed further below in other examples. In different implementations, more, fewer, and/or other components, modules, instructions, and arrangements thereof may be used according to the teachings described herein. In addition, various components, modules, etc. described herein may be implemented as computer-executable instructions, hardware modules, special-purpose hardware (e.g., application specific hardware, application specific integrated circuits (ASICs)), and the like, or some combination or combinations of these.

The network traffic observation module 216 observes network traffic transmitted among a plurality of interconnected servers. The network traffic may be observed and recorded by a variety of network traffic measurement tools such as sFlow®, Wireshark®, and Universal Discovery. These tools generate an output of the network traffic in the form of a spreadsheet, XML file, CSV file, or other appropriate file type, which contains a list of servers and for each of the servers a list of servers and computing devices connected thereto.

In examples, the network traffic may include extraneous network traffic (i.e., noise), which may be unnecessary or which may bias the network traffic so as to imply dependencies that do not exist or to cause insignificant or minor dependencies to appear as significant or major dependencies. The noise removal module 218 thus removes noise from the network traffic. For example, the noise removal module 218 may remove domain name system (DNS) traffic, dynamic host configuration protocol (DHCP) traffic, network monitoring traffic (such as for a CMDB), data back-up traffic, and the like. In examples, a user, such as a network technician or administrator, may manually edit the observed network traffic to remove human-identified noise (that is, noise determined by the user to be extraneous). By removing the noise, the dependencies between the plurality of interconnected servers can better be identified by the server cluster identification module 220.

In particular, the server cluster identification module 220 identifies a cluster of servers within the plurality of interconnected servers based on a network traffic analysis. For example, the server cluster identification module 220 may analyze the network traffic by applying community or social group analysis techniques to the network traffic observed by the network traffic observation module 216. The functionality of the server cluster identification module 220 is described above with reference to the server cluster identification instructions 120 of FIG. 1.

The graphical representation module 222 generates a graphical representation such as a two-dimensional and/or a three-dimensional graphical representation of the cluster or clusters of servers. The graphical representation may illustrate each server within the cluster of servers and the dependencies between each server within the cluster of servers as identified by the server cluster identification module 220. The functionality of the graphical representation module 222 is described above with reference to the graphical representation instructions 122 of FIG. 1.

FIG. 3 illustrates a computer-readable storage medium 304 storing instructions 320, 322 executable to identify a cluster of servers according to examples of the present disclosure. The computer-readable storage medium 304 is non-transitory in the sense that it does not encompass a transitory signal but instead is made up of one or more memory components configured to store the instructions. The computer-readable storage medium may be representative of the memory resource 104 of FIG. 1 and may store machine executable programming instructions, which are executable on a computing system such as computing system 100 of FIG. 1 and/or computing system 200 of FIG. 2.

In the example shown in FIG. 3, the instructions 320, 322 may include server cluster identification instructions 320 and graphical representation instructions 322. In other examples, additional instructions may be included in the computer-readable storage medium 304, such as network traffic observation instructions, noise removal instructions, network traffic analysis instructions, and the like. The instructions 320, 322 of the computer-readable storage medium 304 may be executable so as to perform the techniques described herein, including the functionality described regarding the method 400 of FIG. 4. The functionality of these modules is described below with reference to the functional blocks of FIG. 4 but should not be construed as so limiting.

Figure 4:
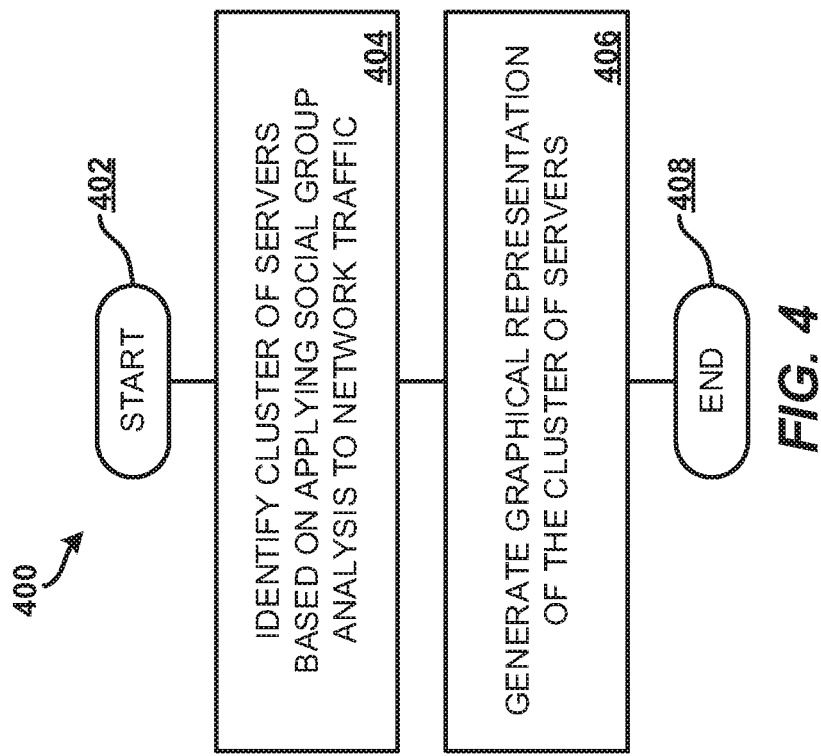
FIG. 4 illustrates a flow diagram of a method to identify a cluster of servers according to examples of the present disclosure.

In particular, FIG. 4 illustrates a flow diagram of a method 400 to identify a cluster of servers according to examples of the present disclosure. The method 400 may be stored as instructions on a non-transitory computer-readable storage medium such as computer-readable storage medium 304 of FIG. 3 or another suitable memory such as memory resource 104 of FIG. 1 that, when executed by a processor (e.g., processing resource 102 of FIG. 1), cause the processor to perform the method 400. It should be appreciated that the method 400 may be executed by a computing system or a computing device such as computing system 100 of FIG. 1 and/or computing system 200 of FIG. 2.

At block 402, the method 400 begins and continues to block 404. At block 404, the method 400 includes identifying a cluster of servers based on applying a social group analysis to network traffic related to a plurality of interconnected servers. Identifying the cluster of servers may be performed, for example, by the server cluster identification instructions 120 and/or 320 of FIGS. 1 and 3 respectively and/or by the server cluster identification module 220 of FIG. 2.

In examples, the cluster is a subset of the plurality of servers, the plurality of servers may be communicatively coupled such that they may communicate via a network, and the cluster of servers may share dependencies. The analysis of network traffic may include an analysis of network traffic transmitted among the plurality of servers. The analysis may also include removing noise or unwanted traffic from the network traffic. The method 400 continues to block 406.

At block 406, the method 400 includes generating a graphical representation of the identified cluster of servers. Generating the graphical representation may be performed, for example, by the graphical representation instructions 122 and/or 322 of FIGS. 1 and 3 respectively and/or by the graphical representation module 222 of FIG. 2. The graphical representation may be a two-dimensional and/or a three-dimensional graphical representation of the cluster by illustrating each server of the cluster of servers and the communicative dependencies between each server of the cluster of servers. The method 400 continues to block 408, where method 400 terminates.

Additional processes also may be included, and it should be understood that the processes illustrated in FIG. 4 represent illustrations, and that other processes may be added or existing processes may be removed, modified, or rearranged without departing from the scope and spirit of the present disclosure.

Figure 5:
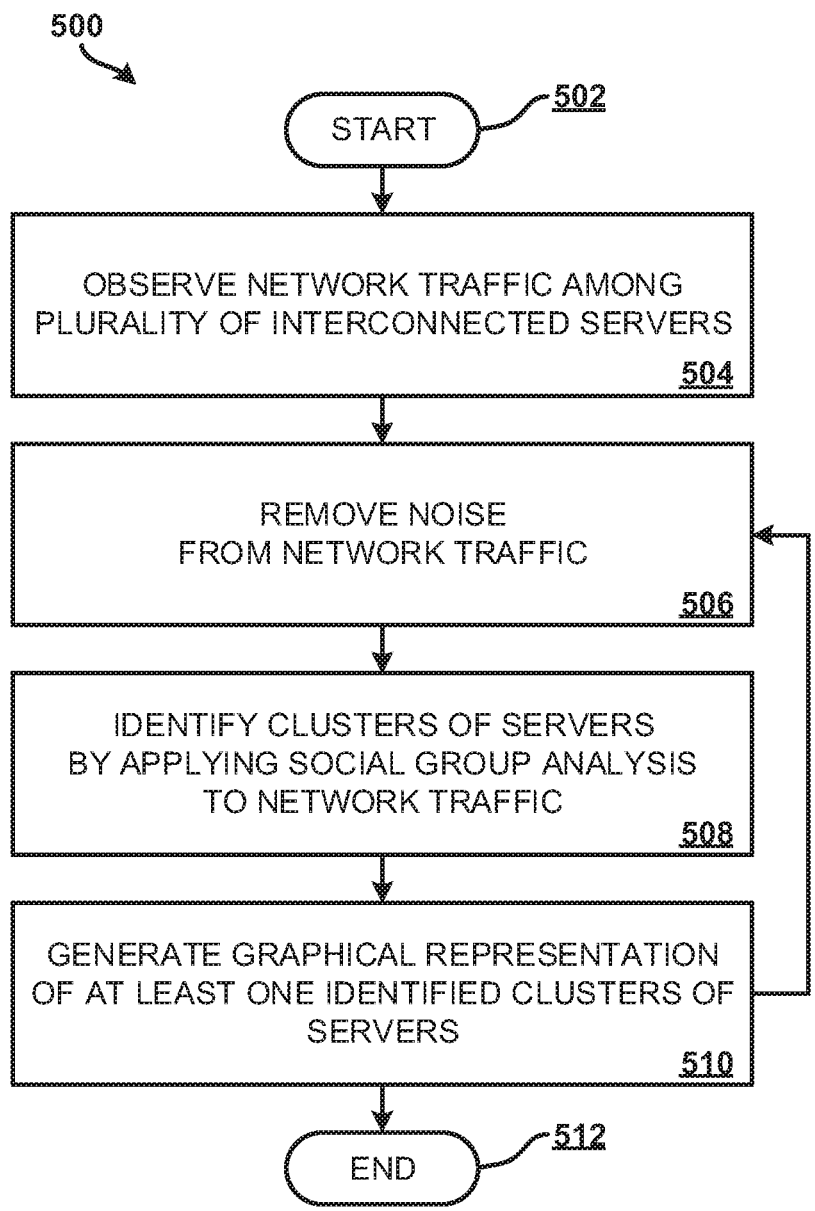
FIG. 5 illustrates a flow diagram of a method to identify a cluster of servers according to examples of the present disclosure.

FIG. 5 illustrates a flow diagram of a method 500 to identify a cluster of servers according to examples of the present disclosure. The method 500 may be executed by a computing system or a computing device such as computing system 100 of FIG. 1 and/or computing system 200 of FIG. 2. The method 500 may also be stored as instructions on a non-transitory computer-readable storage medium such as computer-readable storage medium 304 of FIG. 3 that, when executed by a processor (e.g., processing resource 102 of FIG. 1), cause the processor to perform the method 500. It should be appreciated that the method 500 may be executed by a computing system or a computing device such as computing system 100 of FIG. 1 and/or computing system 200 of FIG. 2.

At block 502, the method 500 begins and continues to block 504. At block 504, the method 500 includes observing, such as by network traffic observation module 216 of computing system 200 of FIG. 2, network traffic transmitted among a plurality of interconnected servers. The method 500 continues to block 506.

At block 506, the method 500 includes removing, such as by noise removal module 218 of computing system 200 of FIG. 2, noise from the network traffic transmitted among the plurality of interconnected servers. The method 500 continues to block 508.

At block 508, the method 500 includes identifying, such as by server cluster identification module 220 of computing system 200 of FIG. 2, clusters of servers within the plurality of interconnected servers based on applying a social group analysis to network traffic related to the plurality of interconnected servers, each of the clusters being substantially independent from the other clusters. Identifying the cluster of servers may be performed, for example, by the server cluster identification instructions 120 and/or 320 of FIGS. 1 and 3 respectively and/or by the server cluster identification module 220 of FIG. 2.

In examples, the cluster is a subset of the plurality of servers, the plurality of servers may be communicatively coupled such that they may communicate via a network, and the cluster of servers may share dependencies. The analysis of network traffic may include an analysis of network traffic transmitted among the plurality of servers. The analysis of the network traffic may further include analyzing internet protocol network traffic transmitted among the plurality of interconnected servers, and analyzing asset management reports such as from a CMDB for assets associated with the plurality of interconnected servers. The method 500 continues to block 510.

Figure 6A:
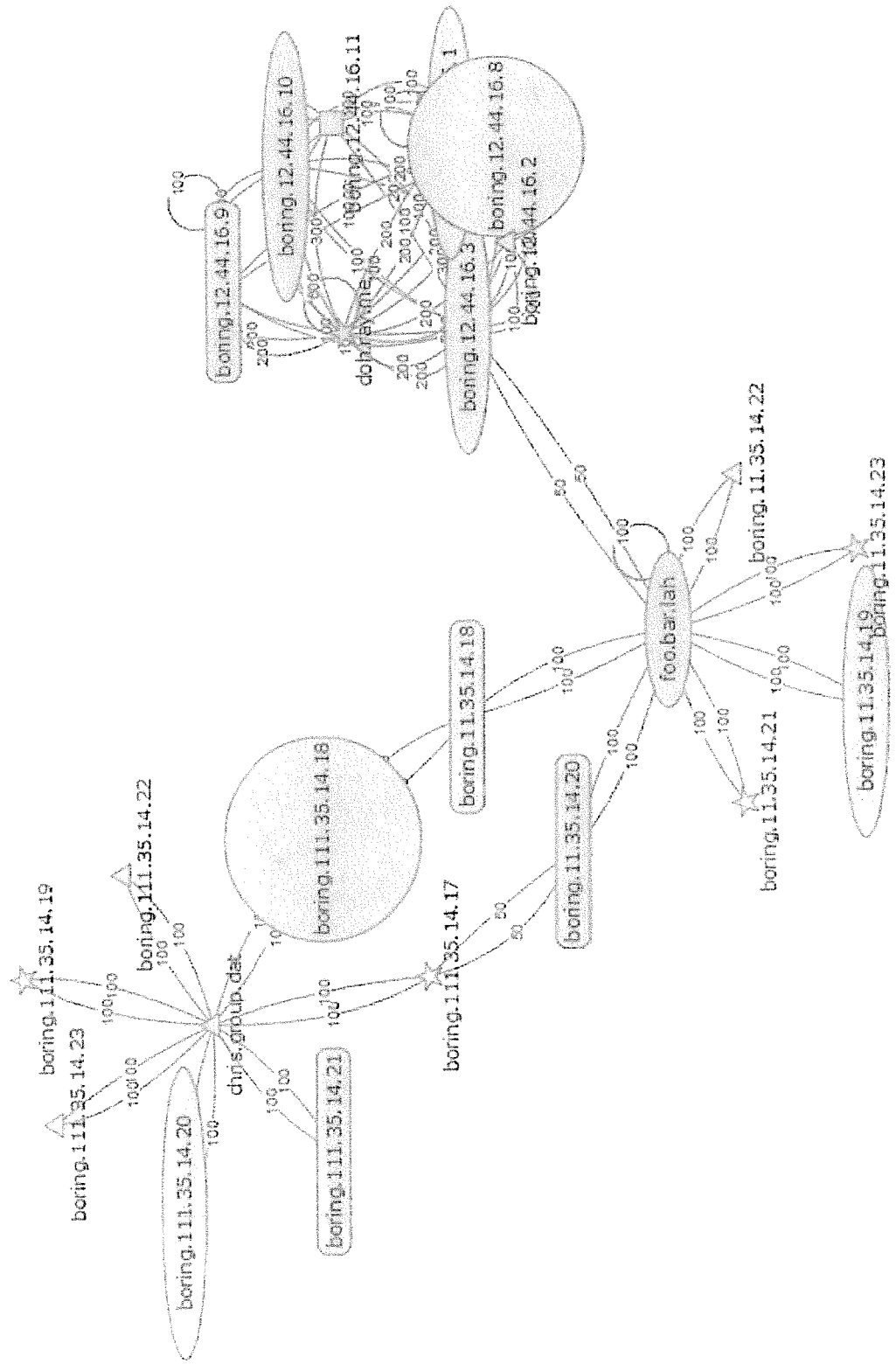
FIGS. 6B-6E illustrate two-dimensional graphical representations of identified clusters of servers according to examples of the present disclosure based on a network illustrated in FIG. 6A.
Figure 6B:
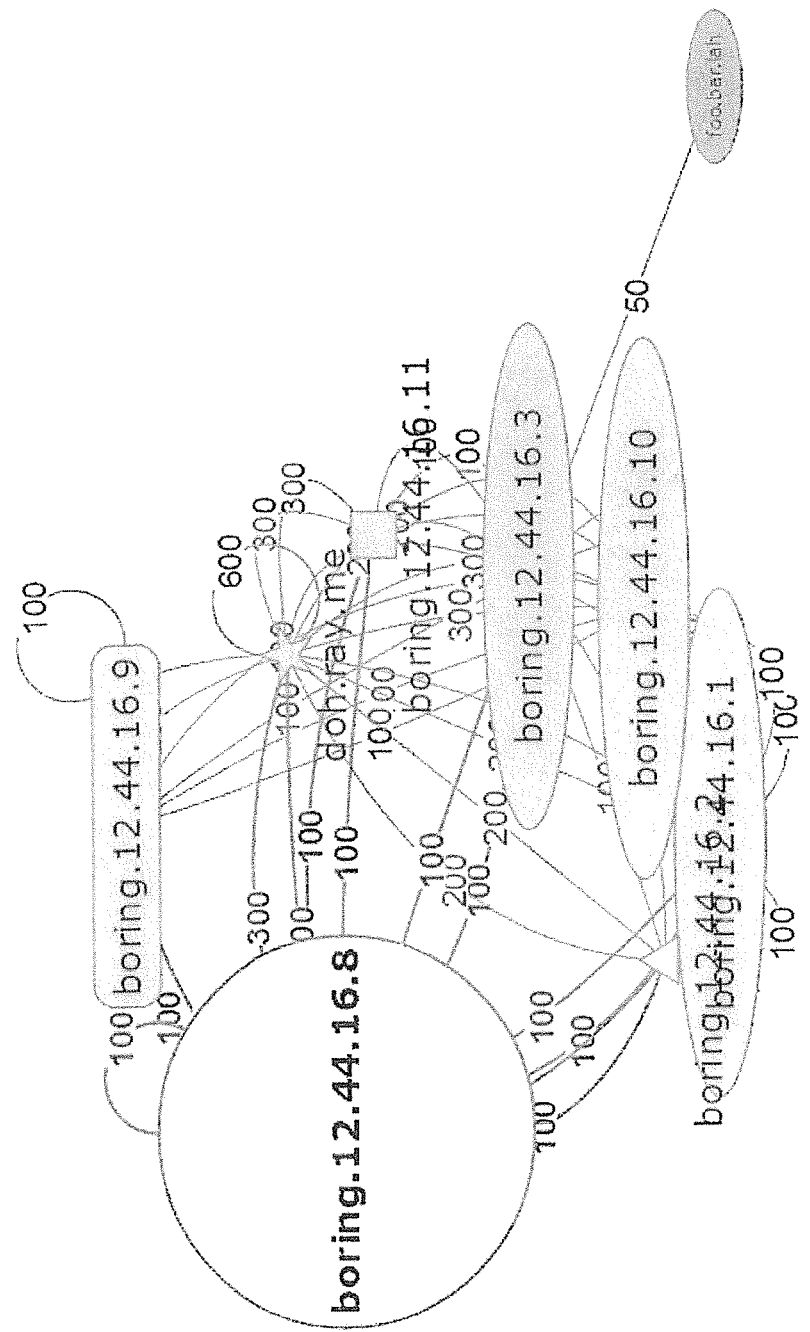
Figure 6C:
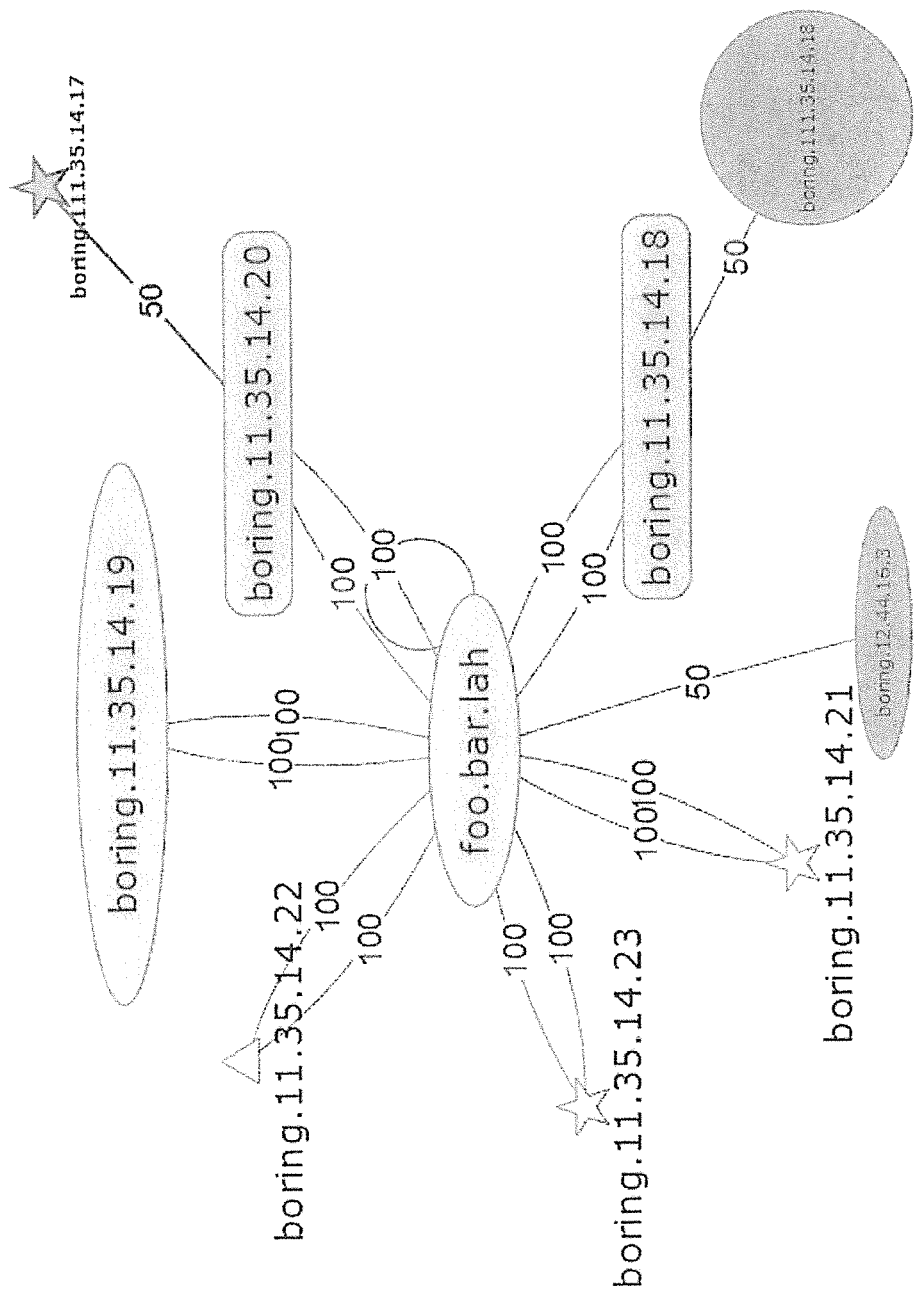
Figure 6D:
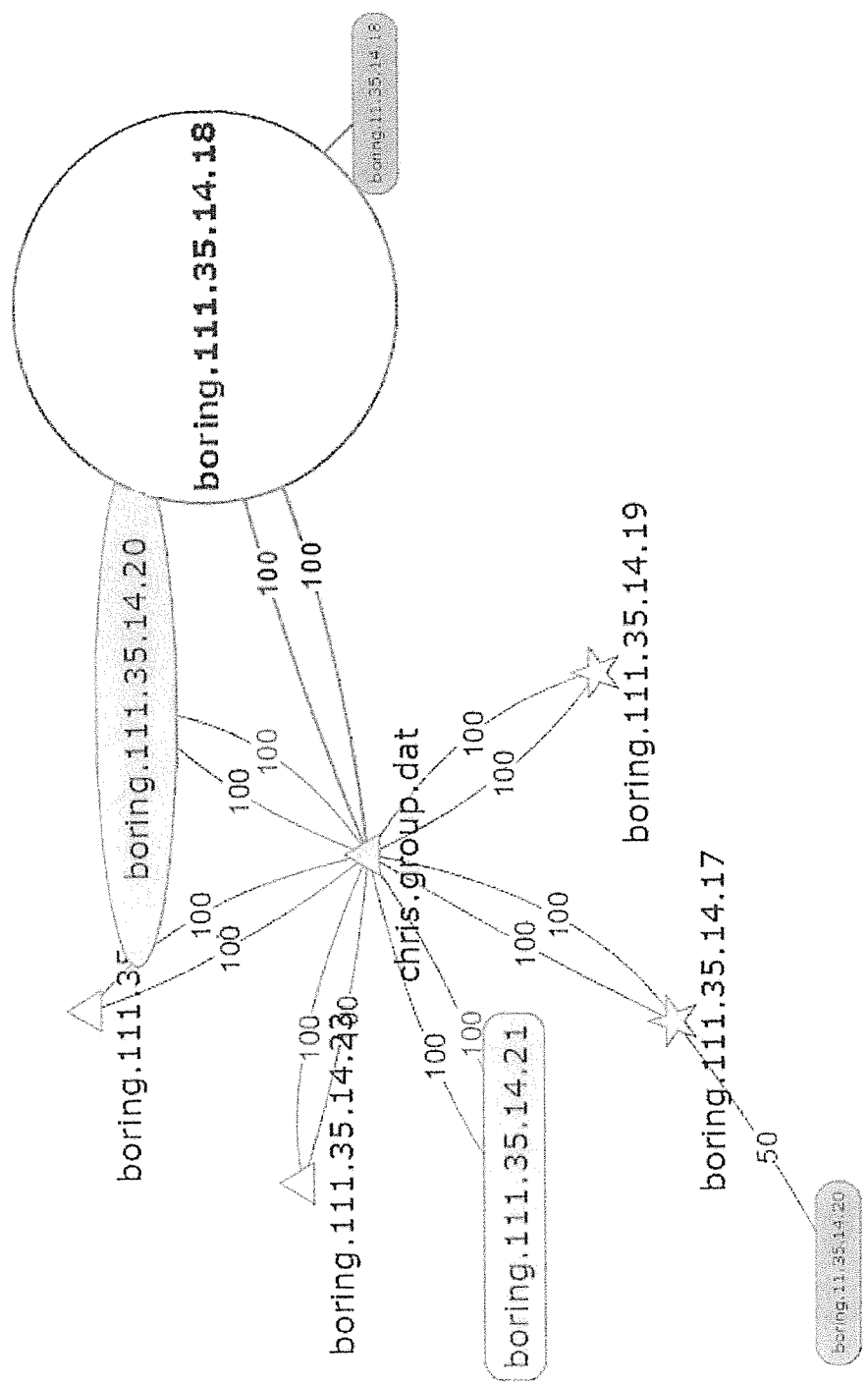

At block 510, the method 500 includes generating, such as by graphical representation module 222 of computing system 200 of FIG. 2, a graphical representation of at least one of the identified clusters of servers. Generating the graphical representation may be performed, for example, by the graphical representation instructions 122 and/or 322 of FIGS. 1 and 3 respectively and/or by the graphical representation module 222 of FIG. 2. The graphical representation may be a two-dimensional and/or a three-dimensional graphical representation of the cluster by illustrating each server of the cluster of servers and the communicative dependencies between each server of the cluster of servers. In examples, generating the graphical representation of the identified clusters of servers includes generating individual graphical representations of each identified cluster of servers. Additionally, generating the graphical representation may include generating a graphical site view representation of the identified clusters of servers (such as shown in FIG. 6A), and generating individual graphical representations of each identified cluster of servers (such as shown in FIGS. 6B-6D). The method 500 continues to block 512, where method 500 terminates.

Additional processes also may be included. For example, the method 500 may include identifying a sub-cluster of servers within one of the identified clusters of servers and generating a graphical representation of the identified sub-cluster of servers. Additionally, a user may identify noise after viewing a generated graphical representation. This enables the identified clusters to be refined or modified. For example, the method 500 may go back to block 506 to remove the noise and re-identify the clusters of servers (block 508) and re-generate the graphical representation (block 510). In this way, the method 500 is recursive from block 510 to block 506. It should be understood that the processes illustrated in FIG. 5 represent illustrations, and that other processes may be added or existing processes may be removed, modified, or rearranged without departing from the scope and spirit of the present disclosure.

Figure 6E:
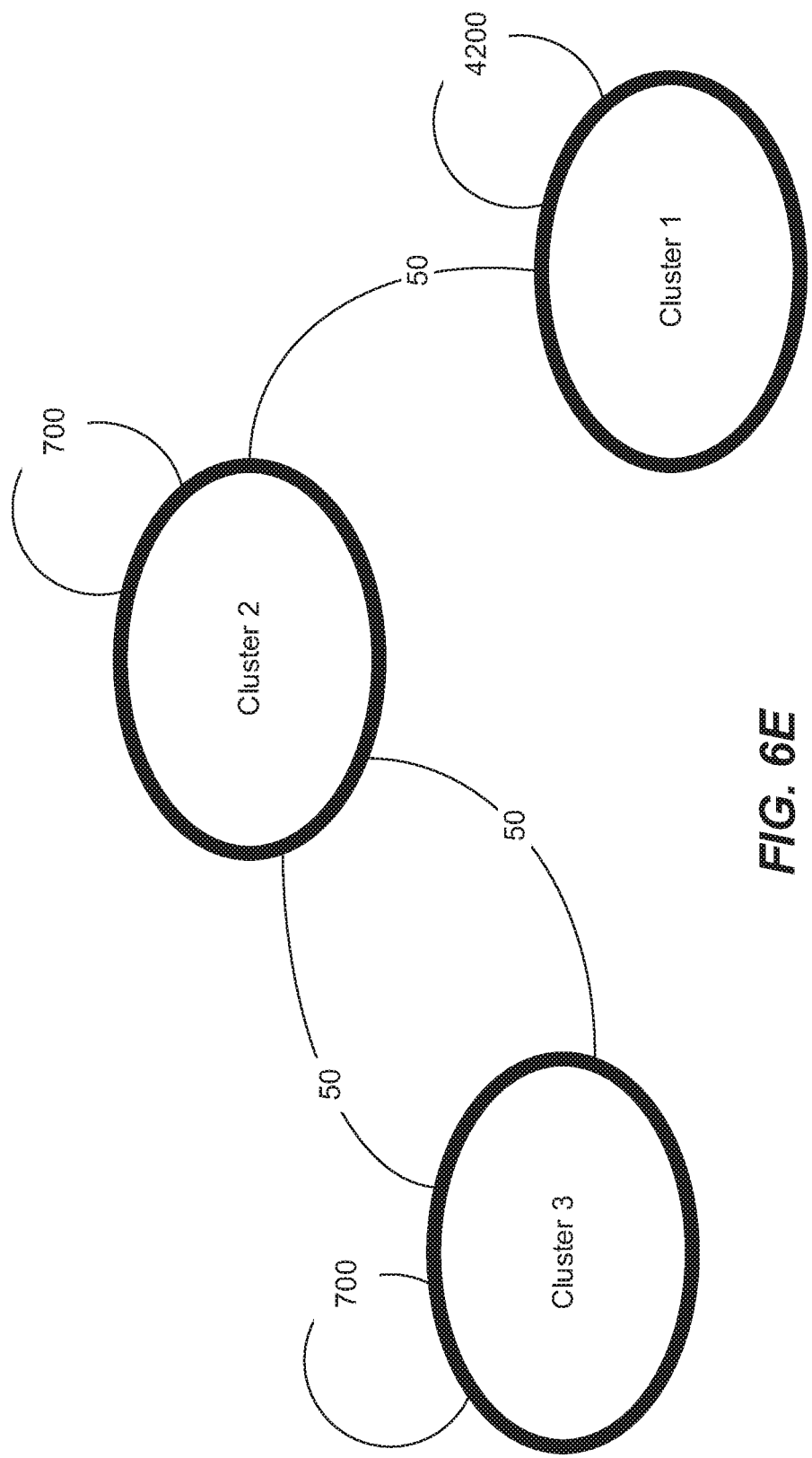

FIGS. 6B-6E illustrate two-dimensional graphical representations of identified clusters of servers according to examples of the present disclosure based on the network illustrated in FIG. 6A. In particular, FIG. 6A illustrates a network topology prior to applying the disclosed techniques. FIGS. 6B-6D illustrated identified clusters 1, 2, and 3 after applying the disclosed techniques. Cluster 1 is shown in greater detail in FIG. 6B, cluster 2 is shown in greater detail in FIG. 6C, and cluster 3 is shown in greater detail in FIG. 6D. Finally, FIG. 6E illustrates a "super-graph" of the three clusters of interconnected servers (cluster 1 of FIG. 6B, cluster 2 of FIG. 6C, and cluster 3 of FIG. 6D). In this example, FIG. 6E represents the entire network overview of FIG. 6A when the individual nodes (i.e., servers) are replaced with clusters. It should be appreciated that the graphical representations illustrated in FIGS. 6A-6E are merely representative examples and are not intended to be limiting.

Shape data may indicate server types (e.g., application servers, file servers, back-up servers, etc.) while the connections between the servers represent dependencies between the servers along with weighted values for those dependencies. For example, turning to FIG. 6C, the triangle-shape of server "boring.11.35.14.22" may represent that the server is a file server. Similarly, the star-shape of servers "boring.11.35.14.23," "boring.11.35.14.21," and "boring.111.35.14.17" may indicate that these servers are application servers. It should be understood that a variety of indicia, including shape type, shape size, shape color, font face, font size, font color, etc., may be used to represent servers of varying types or any other appropriate aspects of a server property of interest to the network technicians and/or administrators. As a further example, the darker color of some servers, such as "boring.111.35.14.17" may indicate that the server exists in another identified cluster, even though it shares dependencies within the present cluster.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A non-transitory computer-readable storage medium storing instructions that, when executed by a processor, cause the processor to:
   record network traffic related to a plurality of interconnected servers through a network traffic measurement tool;
   generate, through the network traffic measurement tool, an output containing a list of interconnected servers and, for at least one interconnected server of the plurality of interconnected servers, a list of other interconnected servers connected to the interconnected server, wherein the output indicates an amount of network traffic transmitted to other interconnected servers within the plurality of interconnected servers;
   identify a cluster of servers within the plurality of interconnected servers by applying a social group analysis to the output based on the network traffic, wherein the network traffic indicates dependencies among the plurality of interconnected servers and the social group analysis is performed using at least a statistical tool; and
   generate a graphical representation of the cluster of servers on a user interface.

2. The non-transitory computer-readable storage medium of claim 1, wherein the plurality of interconnected servers is communicatively coupled.

3. The non-transitory computer-readable storage medium of claim 1, wherein the cluster of servers shares dependencies.

4. The non-transitory computer-readable storage medium of claim 3, wherein the graphical representation is a three-dimensional graphical representation illustrating:
 each server of the cluster of servers; and
 the dependencies between each server of the cluster of servers.

5. The non-transitory computer-readable storage medium of claim 1, wherein the instructions, when executed, further cause the processor to perform:
 an analysis of the network traffic related to the plurality of interconnected servers, wherein the analysis of the network traffic related to the plurality of interconnected servers comprises:
 an analysis of network traffic transmitted among the plurality of interconnected servers; and
 a removal of noise from the network traffic transmitted among the plurality of interconnected servers.

6. The non-transitory computer-readable storage medium of claim 1, wherein at least one of the plurality of interconnected servers is a virtual server.

7. The non-transitory computer-readable storage medium of claim 1, wherein the network traffic measurement tool includes at least one of sFlow, Wireshark, or Universal Discovery.

8. The non-transitory computer-readable storage medium of claim 1, wherein the statistical tool includes an igraph package in a R statistical computing application.

9. A system comprising:
 at least one processor; and
 a memory storing instructions that, when executed by the at least one processor, cause the system to:
  record network traffic related to a plurality of interconnected servers through a network traffic measurement tool;
  generate, through the network traffic measurement tool, an output containing a list of interconnected servers and, for at least one interconnected server of the plurality of interconnected servers, a list of other interconnected servers connected to the interconnected server, wherein the output indicates an amount of network traffic transmitted to other interconnected servers within the plurality of interconnected servers;
  identify a cluster of servers within the plurality of interconnected servers by applying a social group analysis to the output based on the network traffic, wherein the network traffic indicates dependencies among the plurality of interconnected servers and the social group analysis is performed using at least a statistical tool; and
  generate a graphical representation of the cluster of servers on a user interface.

10. The system of claim 9, wherein the cluster of servers represents servers with dependencies among the cluster of servers and no dependencies among servers not within the cluster of servers.

11. The system of claim 9, wherein the instructions stored in the memory, when executed, further cause the system to:
 analyze network traffic transmitted among the plurality of interconnected servers; and
 remove noise from the network traffic transmitted among the plurality of interconnected servers.

12. The system of claim 9, wherein the network traffic measurement tool includes at least one of sFlow, Wireshark, or Universal Discovery.

13. The system of claim 9, wherein the statistical tool includes an igraph package in a R statistical computing application.

14. A method comprising:
 recording, by a computing system, network traffic related to a plurality of interconnected servers through a network traffic measurement tool;
 generating, by the computing system, through the network traffic measurement tool, an output containing a list of interconnected servers and, for at least one interconnected server of the plurality of interconnected servers, a list of other interconnected servers connected to the interconnected server, wherein the output indicates an amount of network traffic transmitted to other interconnected servers within the plurality of interconnected servers;
 identifying, by the computing system, a cluster of servers within the plurality of interconnected servers by applying a social group analysis to the output based on the network traffic, wherein the network traffic indicates dependencies among the plurality of interconnected servers and the social group analysis is performed using at least a statistical tool; and
 generating, by the computing system, a graphical representation of the cluster of servers on a user interface.

15. The method of claim 14, further comprising:
 analyzing, by the computing system, network traffic transmitted among the plurality of interconnected servers; and
 removing, by the computing system, noise from the network traffic transmitted among the plurality of interconnected servers.

16. The method of claim 14, wherein generating the graphical representation of the cluster of servers includes generating individual graphical representations of the cluster of servers in a plurality of clusters of servers.

17. The method of claim 14, further comprising:
 identifying, by the computing system, a sub-cluster of servers within the plurality of interconnected servers; and
 generating, by the computing system, a graphical representation of the sub-cluster of servers along with the cluster of servers.

18. The method of claim 15, wherein analyzing the network traffic transmitted among the plurality of interconnected servers comprises:
 analyzing internet protocol network traffic transmitted among the plurality of interconnected servers, and
 analyzing asset management reports of assets associated with the plurality of interconnected servers.

19. The method of claim 14, wherein generating the graphical representation of the cluster of servers comprises:
 generating a graphical site view representation of the cluster of servers, and
 generating an individual graphical representation of each identified cluster in the plurality of interconnected servers.

20. The method of claim 14, wherein the network traffic measurement tool includes at least one of sFlow, Wireshark, or Universal Discovery.

* * * * *